(12) United States Patent
Oh et al.

(10) Patent No.: US 8,369,465 B2
(45) Date of Patent: Feb. 5, 2013

(54) FREQUENCY OFFSET ESTIMATION APPARATUS AND METHOD IN WIRELESS TELECOMMUNICATION SYSTEM

(75) Inventors: Ji-myung Oh, Goyang-si (KR); Yong-suk Hwang, Yongin-si (KR); Jae-hyeong Kim, Seoul (KR)

(73) Assignee: Seah Networks Co., Ltd., Seoul (KR)

( * ) Notice: Subject to any disclaimer, the term of this patent is extended or adjusted under 35 U.S.C. 154(b) by 1227 days.

(21) Appl. No.: 12/158,570

(22) PCT Filed: Dec. 28, 2006

(86) PCT No.: PCT/KR2006/005795
§ 371 (c)(1),
(2), (4) Date: Jun. 20, 2008

(87) PCT Pub. No.: WO2007/078095
PCT Pub. Date: Jul. 12, 2007

(65) Prior Publication Data
US 2009/0003423 A1    Jan. 1, 2009

(30) Foreign Application Priority Data
Dec. 30, 2005 (KR) .................. 10-2005-0135225

(51) Int. Cl.
*H04L 27/06* (2006.01)
(52) U.S. Cl. .................. 375/344; 375/326
(58) Field of Classification Search .......... 375/150, 375/152, 343, 340, 344, 316, 373, 326
See application file for complete search history.

(56) References Cited

U.S. PATENT DOCUMENTS

| | | | | |
|---|---|---|---|---|
| 5,732,105 A * | 3/1998 | Andren et al. | ........ | 375/226 |
| 5,881,099 A * | 3/1999 | Takahashi et al. | ........ | 375/141 |
| 5,949,817 A * | 9/1999 | Marshall | ........ | 375/142 |
| 5,960,044 A * | 9/1999 | Montreuil | ........ | 375/322 |
| 6,304,620 B1 * | 10/2001 | Rouphael | ........ | 375/344 |
| 6,693,882 B1 * | 2/2004 | Gu et al. | ........ | 370/252 |
| 6,804,290 B1 * | 10/2004 | King et al. | ........ | 375/142 |
| 7,139,340 B2 * | 11/2006 | Scarpa | ........ | 375/344 |
| 7,313,125 B2 * | 12/2007 | Hori et al. | ........ | 370/343 |
| 7,545,891 B1 * | 6/2009 | Pare et al. | ........ | 375/344 |
| 7,593,482 B2 * | 9/2009 | Gong et al. | ........ | 375/316 |
| 2002/0141356 A1 * | 10/2002 | Beidas et al. | ........ | 370/324 |
| 2002/0145971 A1 * | 10/2002 | Cho et al. | ........ | 370/208 |
| 2002/0196731 A1 | 12/2002 | Laroia et al. | | |
| 2003/0043768 A1 * | 3/2003 | Chang et al. | ........ | 370/335 |
| 2003/0112743 A1 * | 6/2003 | You et al. | ........ | 370/203 |
| 2003/0156534 A1 * | 8/2003 | Coulson et al. | ........ | 370/210 |
| 2004/0005022 A1 * | 1/2004 | Zhu et al. | ........ | 375/365 |
| 2004/0071234 A1 * | 4/2004 | Li | ........ | 375/341 |
| 2004/0131031 A1 * | 7/2004 | Stehle et al. | ........ | 370/335 |
| 2005/0152317 A1 * | 7/2005 | Awater et al. | ........ | 370/338 |

(Continued)

FOREIGN PATENT DOCUMENTS

JP  2001-308821 A  11/2001
JP  2002-026858 A  1/2002

*Primary Examiner* — Emmanuel Bayard

(57) ABSTRACT

The present invention relates to an apparatus and method for estimating a frequency offset in a wireless telecommunication system. The present invention does not estimate an initial frequency offset using a preamble which is the initial symbol of a frame upon estimation of the frequency offset in the wireless telecommunication system, but estimates a frequency offset using correlation of a cyclic prefix (CP) existing in each symbol, thereby eliminating a need to reproduce information about separate preamble signals and preamble signals, and easily estimating a frequency offset using only input signals.

9 Claims, 4 Drawing Sheets

U.S. PATENT DOCUMENTS

| | | | |
|---|---|---|---|
| 2005/0163263 A1* | 7/2005 | Gupta et al. | 375/343 |
| 2005/0180516 A1 | 8/2005 | Lee et al. | |
| 2005/0251844 A1* | 11/2005 | Martone et al. | 725/118 |
| 2006/0018413 A1* | 1/2006 | Gupta | 375/343 |
| 2006/0222137 A1* | 10/2006 | Wang et al. | 375/371 |
| 2006/0274843 A1* | 12/2006 | Koo et al. | 375/260 |
| 2006/0291550 A1* | 12/2006 | Wang et al. | 375/229 |
| 2007/0025476 A1* | 2/2007 | Rasmussen et al. | 375/343 |
| 2007/0058708 A1* | 3/2007 | Bultan et al. | 375/226 |
| 2009/0268801 A1* | 10/2009 | Zhang et al. | 375/232 |

\* cited by examiner

[Fig. 1]
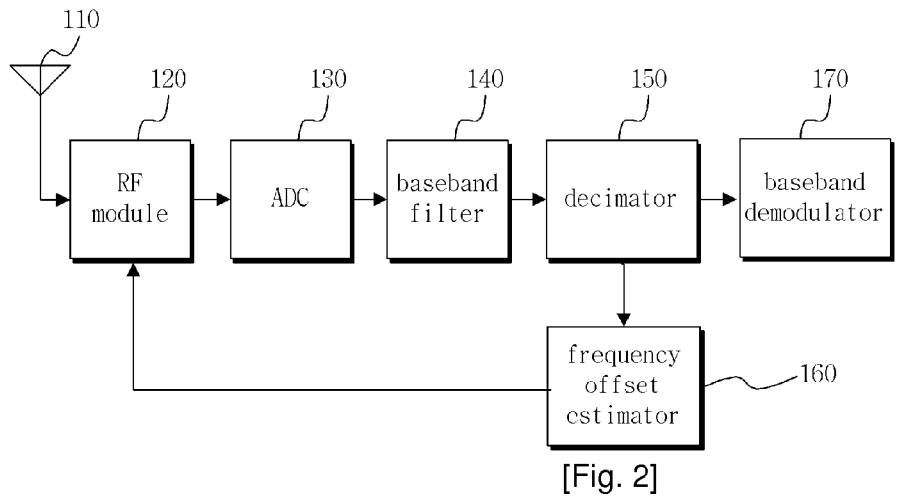
[Fig. 2]
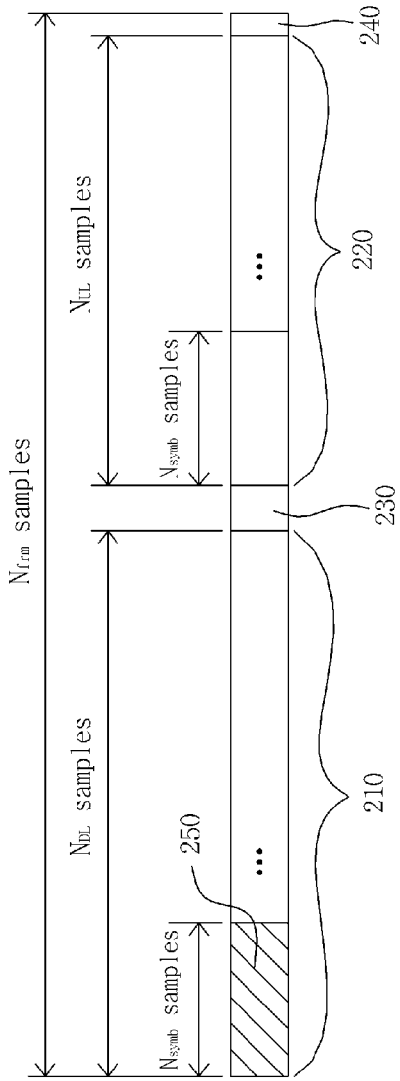

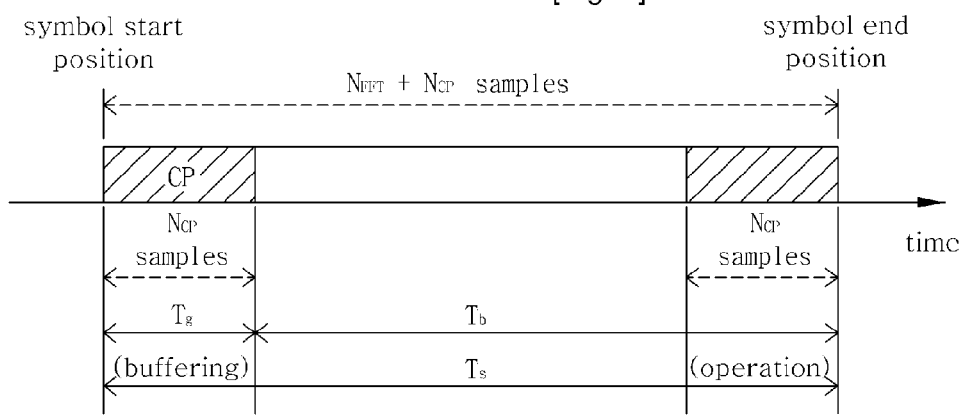
[Fig. 3]
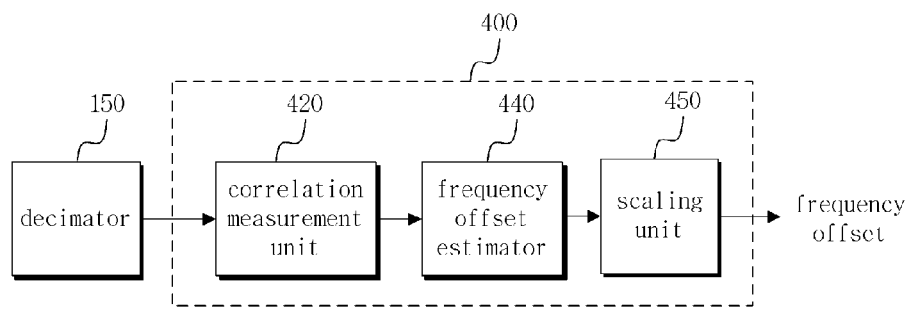
[Fig. 4]

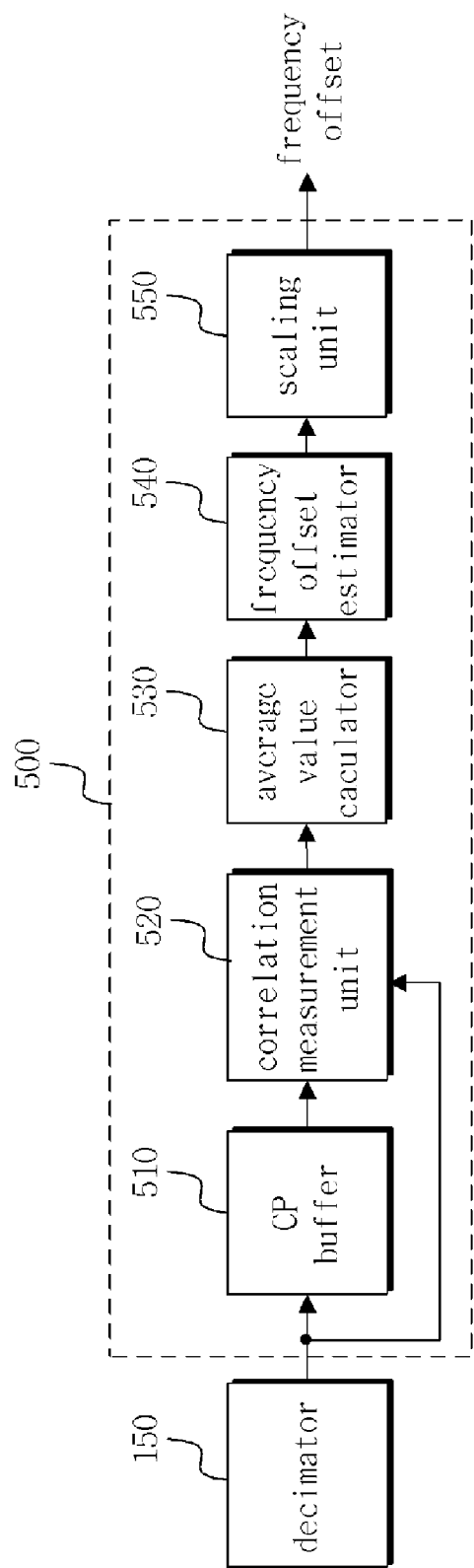
[Fig. 5]

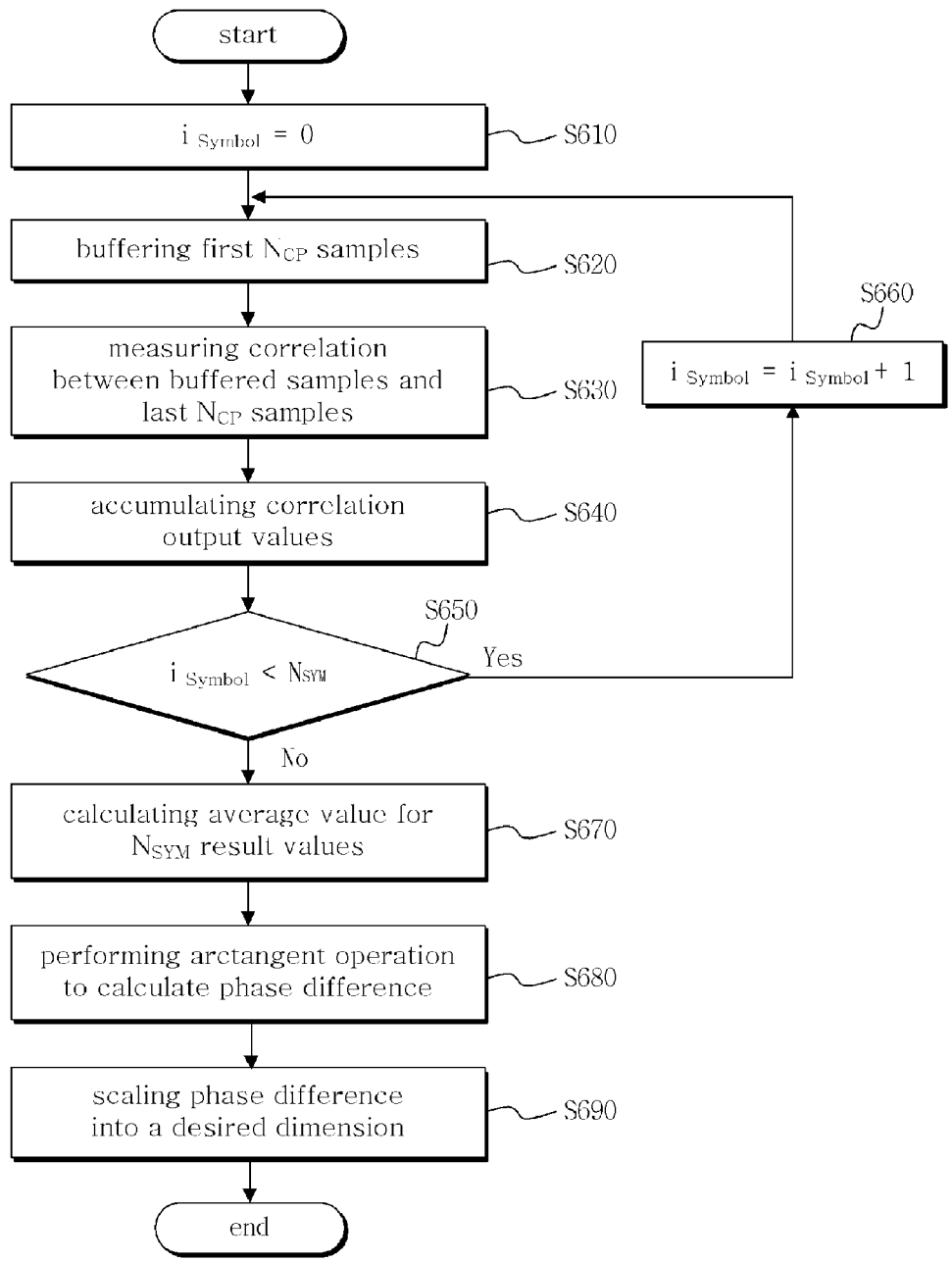
[Fig. 6]

FREQUENCY OFFSET ESTIMATION APPARATUS AND METHOD IN WIRELESS TELECOMMUNICATION SYSTEM

CROSS REFERENCE TO RELATED APPLICATIONS

This application is a US National Stage of International Patent Application No. PCT/KR2006/005795, filed Dec. 28, 2006, which in turn claims the benefit of Korean Patent Application No. 10-2005-0135225, filed Dec. 30, 2005, the disclosures of both applications are incorporated herein by reference.

TECHNICAL FIELD

The present invention relates generally to an apparatus and method for estimating a frequency offset in a wireless telecommunication system, and, more particularly, to an apparatus and method for estimating a frequency offset which is generated upon initial synchronization of a terminal, using a cyclic prefix (CP) included in each symbol of frames used in a portable Internet system.

BACKGROUND ART

Since a cellular mobile telecommunication system has been developed in America in the late 1970s, voice communication services have been provided based on Advanced Mobile Phone Service (AMPS), which are 1st generation mobile communication systems, in Korea. Thereafter, in the mid-1990s, 2nd generation mobile communication system began and have been commercialized, and in the late 1990s, International Mobile Telecommunication-2000 (IMT-2000), which are 3rd generation mobile communication systems developed for wireless multimedia and high-speed data services, have been partially commercialized, and the services thereof have been provided.

Meanwhile, the technology development is currently under way to move beyond 3rd generation mobile communication systems toward 4th generation mobile communication systems. Furthermore, research to portable Internet technology which provides higher-speed data transmission services than 3rd generation mobile communication systems has been actively conducted.

Portable Internet not only satisfies the desires of users who want to be provided with high-speed Internet services anywhere and anytime, but is also expected to aid new promising businesses because of considerable effects on overall domestic information and communication businesses. Therefore, international standards for portable Internet services are currently being progressed in Institute of Electrical and Electronics Engineers (IEEE) 802.16e.

Portable Internet systems are implemented so as for users to use portable Internet services even during high-speed movement using an Orthogonal Frequency Division Multiple Access (OFDMA) scheme and a Time Division Duplexing (TDD) scheme.

The OFDMA scheme used in the portable Internet systems uses a plurality of subcarriers within a channel bandwidth in order to transmit data. The subcarriers are arranged such that a bandwidth is optimized, thereby avoiding the interference between the subcarriers, and decreasing loss due to frequency-selection paging, thereby acquiring a frequency diversity advantage.

Therefore, in the portable Internet system, the symbol/frequency and offset estimation, symbol/frequency compensation, symbol/frequency synchronization of OFDMA signals transmitted and received become more important.

DISCLOSURE OF INVENTION

Technical Problem

Accordingly, the present invention is provided to more accurately estimate and compensate an initial frequency offset which may occur in a reception procedure in a wireless telecommunication system.

In detail, the object of the present invention is to provide an apparatus and method for more accurately estimating a frequency offset using a cyclic prefix (CP) included in each symbol.

Another object of the present invention is to provide an apparatus and method for buffering a portion corresponding to the cyclic prefix of a symbol and measuring the correlation between the portion and a portion corresponding to last $N_{CP}$ samples of a symbol which are identical to the cyclic prefix, thereby easily estimating a frequency offset.

Further object of the present invention is to provide an apparatus and method for more accurately estimating a frequency offset by summing up respective correlation values for a plurality of symbols and using the average value thereof.

Technical Solution

In order to accomplish the above objects, the present invention provides a frequency offset estimation apparatus in a wireless telecommunication system, including an analog to digital converter for converting analog signals received through an antenna into digital signals; a decimator for re-sampling the over-sampled digital signals outputted from the analog to digital converter; and a frequency offset estimator for measuring correlation values between first $N_{CP}$ samples and last $N_{CP}$ samples in a symbol unit for samples outputted from the decimator and estimating a frequency offset value based on the measured correlation values.

Furthermore, the present invention provides a frequency offset estimator of a wireless telecommunication system, including a correlation measurement unit for measuring correlation values between first $N_{CP}$ samples and last $N_{CP}$ samples in a symbol unit; and a frequency offset calculator for estimating a frequency offset value based on the measured correlation values.

Preferably, the frequency offset estimator further includes an average value calculator for summing up the correlation values, measured by the correlation measurement unit in a symbol unit, and calculating an average value of the summed correlation values.

Furthermore, the frequency offset estimator further includes a cyclic prefix buffer for buffering a cyclic prefix of each symbol for the samples. Therefore, the correlation measurement unit measures correlation between the cyclic prefix stored in the cyclic prefix buffer and the last $N_{CP}$ samples upon input of last $N_{CP}$ samples of each symbol.

Meanwhile, the present invention includes a method of estimating a frequency offset in a wireless telecommunication system, comprising the steps of a) measuring correlation values between first $N_{CP}$ samples and last $N_{CP}$ samples in a symbol unit; and b) estimating a frequency offset value based on the measured correlation values.

The step a) comprises the steps of a-1) buffering a cyclic prefix of each symbol for the samples; and a-2) measuring correlation values between the buffered cyclic prefix and the last $N_{CP}$ samples upon input of the last $N_{CP}$ samples of each symbol.

The step b) comprises the steps of b-1) summing up the correlation values measured in a symbol unit; b-2) calculating an average value of the summed correlation values; and b-3) estimating a frequency offset value based on the average value.

Advantageous Effects

According to the present invention, there in an advantageous to easily estimate a frequency offset using only input signals, that is, symbols, without reproducing information about separate preamble signals and preamble signals, when the initial frequency offset of a terminal is estimated in a wireless telecommunication system.

Furthermore, according to the present invention, a cyclic prefix existing in each symbol is used rather than a preamble existing only in the first symbol of a frame, so that there is an advantageous to acquire a more accurate frequency offset by acquiring a sum of correlations performed on a plurality of symbols and the average value thereof.

Furthermore, according to the present invention, there is an advantageous to easily calculate the correlation between symbols by buffering a portion corresponding to the cyclic prefix of a symbol.

BRIEF DESCRIPTION OF THE DRAWINGS

FIG. 1 is a schematic diagram illustrating an apparatus for estimating a frequency offset in a wireless telecommunication system.

FIG. 2 is a diagram illustrating an example of the structure of a frame used in the wireless telecommunication system.

FIG. 3 is a diagram illustrating the structure of a symbol constituting the frame illustrated in FIG. 2.

FIG. 4 is a diagram illustrating an apparatus for estimating a frequency offset according to a first embodiment in a wireless telecommunication system.

FIG. 5 is a diagram illustrating an apparatus for estimating a frequency offset in a wireless telecommunication system according to a second embodiment of the present invention.

FIG. 6 is a flowchart for acquiring an average value of correlation values of symbols in a method of estimating a frequency offset in a wireless telecommunication system according to the present invention.

MODE FOR THE INVENTION

Hereinafter, an exemplary embodiment of the present invention will be described in detail with reference to the accompanying drawings. Well known functions and constructions are not described in detail since they would obscure the invention in unnecessary detail.

FIG. 1 is a schematic diagram illustrating an apparatus for estimating a frequency offset. Referring to FIG. 1, the apparatus for estimating a frequency offset comprises a Radio Frequency (RF) module 120, an Analog to Digital Converter (ADC) 130, a baseband filter 140, a decimator 150, a frequency offset estimator 160 and a baseband demodulator 170.

The RF module 210 converts RF band signals received via antenna to low-frequency band signals. The ADC 130 converts analog signals outputted from the RF module 120 into digital signals. The baseband filter 140 filters digital signals outputted from the ADC 130 to remove noise. The decimator 150 re-samples the over-sampled digital signals filtered by the baseband filter 140. The signals outputted from the decimator 150 are input to the frequency offset estimator 160. The frequency offset estimator 160 estimates the frequency offset which is generated upon initial synchronization of a terminal and outputs the estimated frequency offset to the RF module 120. Meanwhile, The signals outputted from the decimator 150 input to the baseband demodulator 170, and the baseband demodulator 170 performs a process of demodulation.

The structure of a frame used in a portable Internet system employing Time Division Duplexing (TDD) is described with reference to FIG. 2.

According to time division duplexing scheme, one frame is divided into a part for transmission and a part for reception in time division transmission scheme which are then used. As illustrated in FIG. 2, one frame is divided into a downlink frame 210 and an uplink frame 220 and, thus bidirectional communication is performed using one frequency. In FIG. 2, it is shown that one frame is composed of a plurality of samples, one frame is composed of $N_{frm}$ samples, the downlink frame 310 is composed of $N_{DL}$ samples, and the uplink frame 320 is composed of $N_{UL}$ samples. Meanwhile, the downlink frame and the uplink frame are respectively divided in a unit which is called a symbol, and the symbol is also composed of a plurality of samples.

The downlink frame 210 starts in orders of a preamble symbol, data symbols, and the preamble signal may be used for initial synchronization, sell search, frequency offset and channel estimation. Furthermore, there is a Transmit/receive Transition Gap (TTG) 240 between the downlink frame 210 and the uplink frame 220, during which a base station switches from a transmission to a reception mode and terminal switch from a reception to a transmission mode.

Furthermore, there is a Receive/transmit Transition (RTG) Gap 240 exists in the last of the frame to distinguish the current uplink frame 220 from a subsequently transmitted downlink frame 210, during which a base station switches from a reception to a transmission mode and terminal switch from a transmission to a reception mode.

The structure of the symbol constituting the frame is described below with reference to FIG. 3.

One symbol has a valid symbol period including $N_{FFT}$ samples during time $T_b$, and there is a cyclic prefix which is copied with $N_{CP}$ samples during the last time $T_g$ of the valid symbol period and is then added to the front of the valid symbol period.

Furthermore, using the cyclic prefix, multiple-path signals are collected, and orthogonality is maintained between subcarriers. Therefore, one symbol is composed of $N_{FFT}+N_{CP}$ samples, and in each symbol, first $N_{CP}$ samples are identical to last $N_{CP}$ samples.

As a result, a method of estimating a frequency offset using the preamble of a downlink frame which is one of the structural characteristics of a frame used in the above-described portable Internet system may be used. In this case, there are problems in that a preamble index used for a specific cell must be known, and preamble signals for the preamble index must be reproduced.

Furthermore, in particular, in a multi-cell in which several cells exist, there is a considerable problem in that frequency offset estimation is inaccurate upon estimation of an initial frequency offset.

In order to resolve the above-described problems, the present invention is characterized to use a fact in which first $N_{CP}$ samples are identical to last $N_{CP}$ samples in each symbol having a frame structure used in a portable Internet system, to calculate correlations between first $N_{CP}$ samples and last $N_{CP}$ samples, to acquire channel characteristics between a transmitter and a receiver, and to estimate a frequency offset.

FIG. 4 is a diagram illustrating an apparatus for estimating a frequency offset in a wireless telecommunication system according to a first embodiment.

A procedure in which signals received from an antenna pass through an RF/IF module, an analog to digital converter, a baseband filter and a decimator and are input to a frequency offset estimator is similar to the reception procedure of the above described wireless telecommunication system, so that the description thereof is omitted, and thus the frequency offset estimator according to the present invention is described in detail.

The frequency offset estimator 400 according to a first embodiment of the present invention mainly includes a correlation measurement unit 420, a frequency offset calculator 440 and a scaling unit 450.

The correlation measurement unit 420 detects first $N_{CP}$ samples and last $N_{CP}$ samples in a symbol unit for samples outputted from the decimator 150 in real time, and measures correlation values therebetween.

For example, if it is assumed that r(n) is the input signal, $N_{CP}$ is the magnitude of cyclic prefix, and $N_{FFT}$ is the magnitude of FFT, a value R outputted from the correlation measurement unit 420 is same as the following Equation 1:

$$R = \sum_{n=0}^{N_{CP}-1} r(n) r*(n - N_{FFT}) \quad \text{[Equation 1]}$$

In Equation 1, a period in which accumulation is performed is the cyclic prefix period.

The result R of Equation 1 is a complex signal. The frequency offset calculator 440 perform operation in order to acquire the phase of the result value, that is, the phase difference between first $N_{CP}$ samples and last $N_{CP}$ samples. In this case, arctangent operation is generally performed.

The frequency offset value of a current symbol which is the result value of the frequency offset calculator 440 is input to the scaling unit 450, and is then scaled to a desired dimension. The output of the scaling unit 450 is again input to the RF/IF module 120 and is used to compensate for the initial frequency offset.

FIG. 5 is a diagram illustrating an apparatus for estimating a frequency offset in a wireless telecommunication system according to a second embodiment of the present invention.

The frequency offset estimator 500 according to the second embodiment of the present invention is mainly composed of a cyclic prefix buffer 510, a correlation measurement unit 520, an average value calculator 530, a frequency offset calculator 540 and a scaling unit 550.

First, the cyclic prefix buffer 510 buffers first Ncp samples corresponding to a cyclic prefix in a symbol unit for samples outputted from the decimator 150 in real time. Thereafter, the correlation measurement unit 520 measures the correlation between first $N_{cp}$ samples of a symbol stored in the cyclic prefix buffer 510 in sample portions in which the output signals of the decimator 150 correspond to last $N_{cp}$ samples of a symbol.

The average value calculator 530 sums up the measured correlation result values and takes an average value. The sum of the correlation result values which is acquired through this procedure represents a complex value, the phase value of which is the phase difference between the first $N_{cp}$ samples and last $N_{cp}$ samples of a symbol, and this value is the current frequency offset of a symbol.

A procedure of acquiring an average value for the correlation values of a plurality of samples is described below in detail.

The frequency offset calculator 540 performs an arctangent operation in order to the phase of the average value. When the phase value acquired by performing the arctangent operation represents the result between $[-\pi, \pi]$, the actual frequency offset value can be calculated using the following Equation 2:

$$f_{offset} = \phi_{diff} \times 10^7 / (2\pi \times 1024) \text{ [Hz]} \quad \text{[Equation 2]}$$

In Equation 2, $f_{offset}$ is the frequency offset value, and $\phi_{diff}$ is the phase difference.

Finally, the frequency offset value of a current symbol which is the result value of the frequency offset calculator 540 is input to the scaling unit 550, and is then scaled to a desired dimension. The output of the scaling unit 550 is again input to the RF/IF module 120, or the like, and is used to compensate for the initial frequency offset of a terminal.

FIG. 6 is a flowchart for acquiring an average value of correlation values of symbols in a method of estimating a frequency offset in a wireless telecommunication system according to the present invention. For reference, steps before specific steps illustrated in FIG. 6 are performed are suggestive of the prior art described with reference to FIG. 1.

First, in step S610, variable $i_{Symbol}$ is set to '0'. Variable $i_{Symbol}$ is used to count the number of symbols. In step S620, the cyclic prefix buffer 510 buffers first $N_{CP}$ samples in a symbol unit for samples outputted from the decimator 150. By buffering the first $N_{CP}$ samples of a symbol, samples corresponding to a cyclic prefix are temporarily stored in the cyclic prefix buffer 510.

Then, in step S630, the correlation estimation unit 520 measures the correlation between the buffered $N_{CP}$ samples and the last $N_{CP}$ samples of the symbol. In this way, the correlation between first and last $N_{CP}$ samples is measured. In step S640, the average value calculator 530 accumulates the result values of the correlation. Thereafter, in step S650, the value of variable $i_{Symbol}$ is compared with the desired number $N_{SYM}$ of accumulated symbols and, if variable $i_{Symbol}$ is less than the number $N_{SYM}$, the process proceeds to step S660 and variable $i_{Symbol}$ is incremented by 1.

Thereafter, steps S620 to S660 are repeatedly performed. If variable $i_{Symbol}$ is more than or identical to the number $N_{SYM}$, the process proceeds to step S670. The average value calculator 530 calculates an average value of the $N_{SYM}$ result values in step S670.

Then, in step S680, the frequency offset calculator 540 calculates the phase differences between first $N_{CP}$ samples and last $N_{CP}$ samples by performing an arctangent operation. Finally, in step S690, the scaling unit 550 scales the phase differences calculated in step S680 to desired dimension, thereby performing frequency offset estimation.

Of course, after frequency offset estimation has been performed, it is possible to compensate for the initial frequency offset value of a terminal using this.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

The invention claimed is:

1. A frequency offset estimation apparatus in a wireless telecommunication system, comprising:
   an analog to digital converter configured to convert analog signals received through an antenna into digital signals;
   a decimator configured to re-sample over-sampled digital signals outputted from the analog to digital converter; and
   a frequency offset estimator configured to buffer first $N_{CP}$ samples of each symbol on an individual symbol basis for samples output from the decimator, measure correlation values between the first $N_{CP}$ samples and last $N_{CP}$ samples of said each symbol when the last $N_{CP}$ samples are input, sum the correlation values, calculate an average value of the summed correlation values, and estimate a frequency offset value by performing an arctangent operation on the average value,
   wherein the first $N_{CP}$ samples correspond to a cyclic prefix of each symbol.

2. The frequency offset estimation apparatus as claimed in claim 1, further comprising:
   a Radio Frequency (RF)/Intermediate Frequency (IF) module configured to perform at least one operation of demodulation, amplification, and filtering in RF/IF bandwidths,
   wherein the frequency offset estimator is configured to transmit the estimated frequency offset value to the RF/IF module and the RF/IF module is configured to compensate for a frequency offset of a terminal based on the estimated frequency offset value.

3. The frequency offset estimation apparatus as claimed in claim 2, wherein the frequency offset estimator performs scaling on the estimated frequency offset value and transmits the scaled estimated frequency offset value to the RF/IF module.

4. The frequency offset estimation apparatus as claimed in claim 1, wherein the frequency offset estimation apparatus is a receiver or transceiver of a portable Internet system.

5. A frequency offset estimator of a wireless telecommunication system, comprising:
   a cyclic prefix buffer configured to buffer first $N_{CP}$ samples of each symbol on an individual symbol basis, wherein the first $N_{CP}$ samples correspond to a cyclic prefix of each symbol;
   a correlation measurement unit configured to measure correlation values between the first $N_{CP}$ samples and last $N_{CP}$ samples of said each symbol when the last $N_{CP}$ samples are input;
   an average value calculator configured to sum the correlation values and calculate an average value of the summed correlation values; and
   a frequency offset calculator configured to estimate a frequency offset value by performing an arctangent operation on the average value.

6. The frequency offset estimator as claimed in claim 5, further comprising a scaling unit configured to adjust a dimension of the frequency offset value outputted from the frequency offset calculator.

7. A method of estimating a frequency offset in a wireless telecommunication system, comprising:
   buffering first $N_{CP}$ samples of each symbol on an individual symbol basis, wherein the first $N_{CP}$ samples correspond to a cyclic prefix of each symbol;
   measuring correlation values between the first $N_{CP}$ samples and last $N_{CP}$ samples of said each symbol on an individual symbol basis when the last $N_{CP}$ samples are input;
   summing the correlation values and calculating an average value of the summed correlation values; and
   estimating a frequency offset value by performing an arctangent operation on the average value.

8. The method as claimed in claim 7, further comprising, prior to the buffering step, performing sampling on analog signals received from an antenna to convert the analog signals into digital signals.

9. The method as claimed in claim 7, further comprising, after the estimating step, compensating for an initial frequency offset of a terminal based on the estimated frequency offset value.

* * * * *